United States Patent [19]

Loosli

[11] Patent Number: 5,099,548
[45] Date of Patent: Mar. 31, 1992

[54] QUICK SPLICE FOR ROD BELT CONVEYOR

[76] Inventor: Curtis G. Loosli, 311 Westmoreland Ave., Idaho Falls, Id. 83402

[21] Appl. No.: 568,703

[22] Filed: Aug. 17, 1990

[51] Int. Cl.⁵ ............................................. F16G 3/00
[52] U.S. Cl. ...................................... 24/38; 24/33 B; 474/257
[58] Field of Search ............... 24/38, 37, 33 R, 33 A, 24/33 B; 474/204, 257; 198/728, 844

[56] References Cited

U.S. PATENT DOCUMENTS

| 364,673 | 6/1887 | Ritz | 24/37 |
|---|---|---|---|
| 1,756,136 | 4/1930 | Ryther | 198/844 |
| 1,895,969 | 1/1933 | Calhoun | 24/33 B |
| 2,171,055 | 8/1939 | Freedlander | 474/257 |
| 2,477,855 | 8/1949 | Beach | 24/33 B |
| 3,084,408 | 4/1963 | Ireland | 474/257 |
| 4,625,369 | 12/1986 | Musil | 24/33 B |
| 4,654,020 | 3/1987 | Cramer | 474/257 |
| 4,815,587 | 3/1989 | Musil | 24/33 B |

FOREIGN PATENT DOCUMENTS

| 749362 | 5/1956 | United Kingdom | 24/37 |
|---|---|---|---|
| 2212241 | 7/1989 | United Kingdom | 24/33 R |

Primary Examiner—Victor N. Sakran
Attorney, Agent, or Firm—John L. Welsh; N. J. Aquilino

[57] ABSTRACT

A belt splice for connecting the ends of a belt having a plurality of parallel rods thereon. The belt splice includes an upper plate portion with a rod receiving slot and a fastener flange extending distally from the rod receiving slot so as to space a fastener opening on the fastener flange rearwardly from the rod receiving slot. A lower plate portion for engaging the underside of the belt. Matching bolt holes in the lower plate portion and the fastener flange for a fastener to secure the plates to the ends of a belt.

21 Claims, 2 Drawing Sheets

FIG. 7
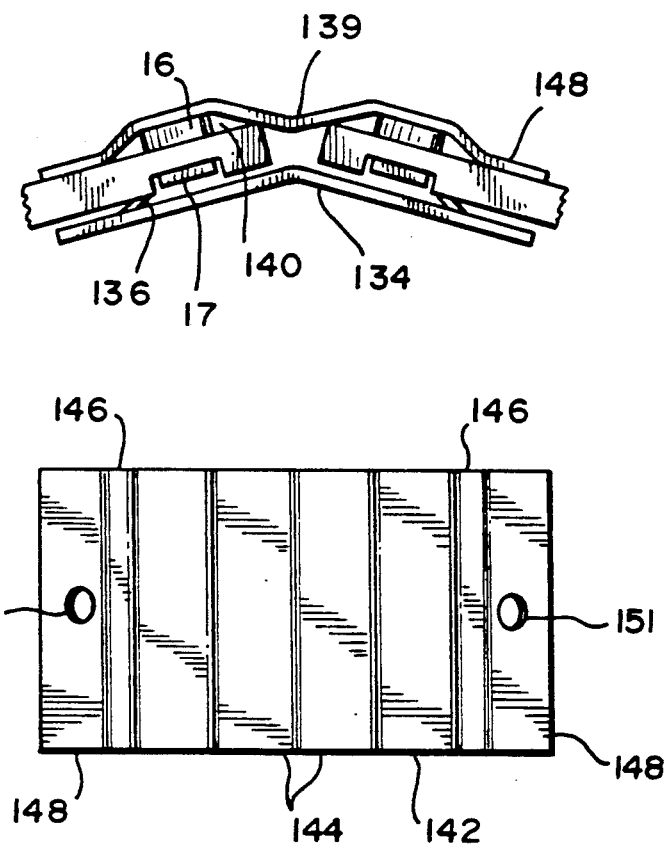
FIG. 8
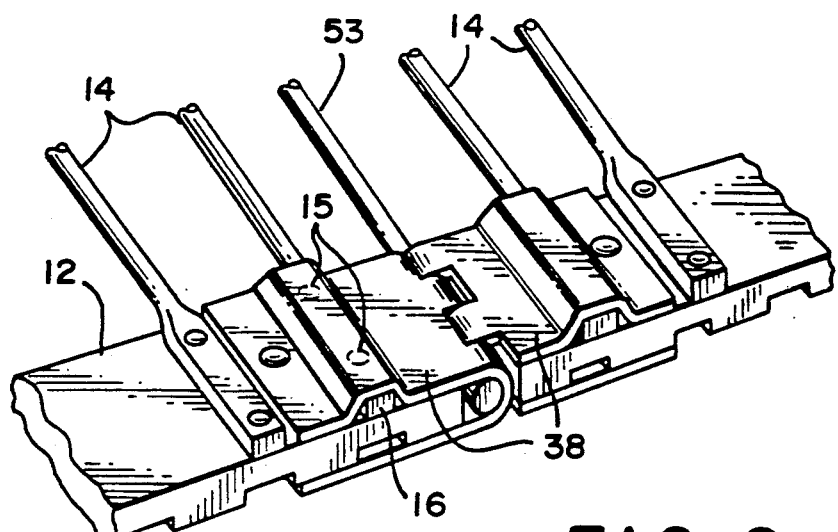
FIG. 9

QUICK SPLICE FOR ROD BELT CONVEYOR

BACKGROUND OF THE INVENTION

The present invention relates to rod belt conveyors, and in particular to a belt splice for connecting the ends of a flexible belt having a plurality of parallel rods attached thereon.

A rod belt harvester conveyor is used to convey and transport and often to size food products such as tomatoes, onions, potatoes and various other vegetables. The spacing between the parallel rods defines an opening which may be used for sizing to allow objects of a lesser size to pass through the rods while the larger products remain on top of the conveying rods.

A typical rod belt conveyor of the type used in agricultural machines, such as harvesters, or the like includes a plurality of tranversely extending rods secured to side bands or belts. Typically the ends of the rods are flattened and secured to the belts by suitable securing means.

The belts are made of a flexible material such as heavy gauge fabric, reinforced rubber or neoprene. The belts form an endless loop and are driven by a suitable conveyor drive, such as gear wheels or drums which engage the belt between the rods or cutout teeth formed on the underside of the belts.

The ends of the belts are connected to form endless loops by suitable fasteners such as the type shown in U.S. Pat. Nos. 4,815,587 and 4,625,369 to Musil. It has been found that the prior art fasteners such as these create a weak point on the endless belt due to the stress placed on the connection to the belt, and the weakening of the cross-section of the belt due to the number of holes being placed in the belt for insertion of fasteners. Therefore the belts are susceptible to breakage. This breakage normally occurs when the machine is in use in the field, and this in turn requires the field worker or machine operator to have an inventory of parts and various special tools, some requiring an electrical power source in order to make the necessary repairs. It will be appreciated that these repairs are sometimes costly and time consuming, particularly where harvesting of a crop within time limits is critical.

SUMMARY OF THE INVENTION

The invention is an improved belt splice for connecting the ends of a flexible harvester conveyor belt. The belt includes a plurality of spaced rods. The belt splice can be installed at the factory or in the field upon the breakage of the belt.

The belt splice may include a hinge or may simply be formed of two angled plates. However, the belt splice must include an upper plate having a rod receiving slot and a fastener flange extending rearwardly or distally from the rod receiving slot, thereby allowing the belt splice to be attached to each end of the belt by a single fastener.

It is an object of the invention to provide a belt splice which is quickly and easily attachable should a breakage in the belt occur while a crop is being harvested. The present invention accomplishes this objective by its unique design which allows it to be securely attached by a single fastener on each end of the belt. Further the design is such that the belt splice may be attached without the requirement of first drilling out the fasteners securing the flattened end of the rod.

It is also an object of the invention to provide a belt splice with no moving parts which can quickly be installed at the factory.

It is a further object of the invention to provide a belt splice which reduces or eliminates the breaking of the belt at the location of the splice.

Still another object is to provide a belt splice which is adjustable in length in order to accommodate various types of belt breakage. This is done by a variable length cable joint assembly.

BRIEF DESCRIPTION OF THE DRAWINGS

FIG. 7 illustrates a side view of a second embodiment of the invention;

FIG. 8 represents a top plane view of the second embodiment of the invention; and FIG. 9 shows a perspective view of a third embodiment including a conventional hinge joint.

DESCRIPTION OF THE PREFERRED EMBODIMENTS

Figure 1:
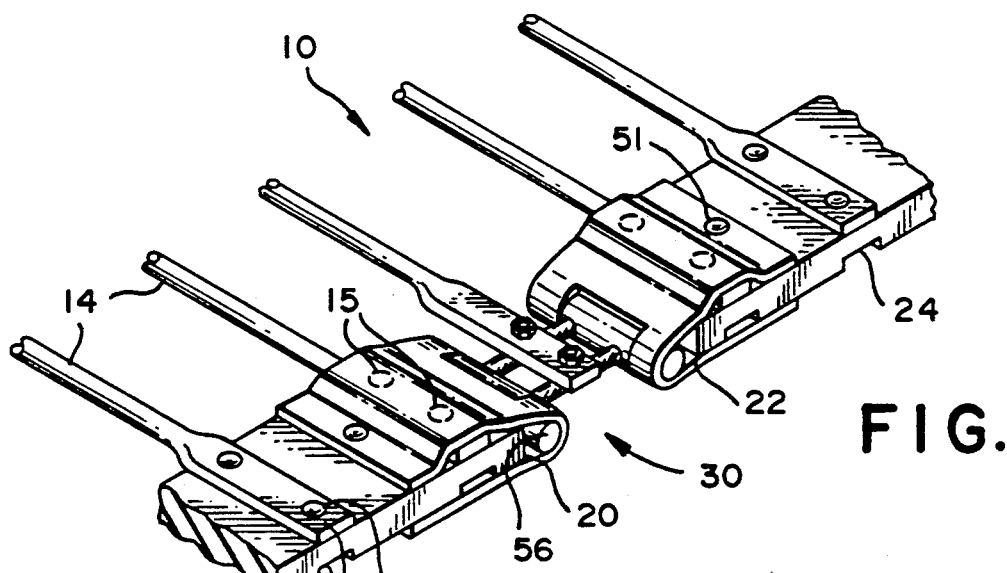
FIG. 1 is a perspective view of a fragmentary harvester belt attached together by a belt splice in accordance with the perferred embodiment of this invention.

Referring to the drawings, a portion of a belted chain harvester 10 is shown which includes a pair of opposite parallel looped traction belts 12, only one of which is shown. The belt is made of rubber or other elastomeric material, and includes an interior reinforcing material such as woven fabric, wire or the like. The belts are spanned by a series of parallel rods 14 each of which includes flattened ends 16 which are secured to the belt 12 by means of a rod attachment including rivets 18 or other suitable fasteners and a backing plate 19. The rods are spaced at predetermined distances which serve as gauging openings allowing less than a predetermined size of a conveyed item to fall therebetween for sorting purposes. The ends 20 and 22 of each belt 12 are joined in an end-to-end abuting relationship by a splice so that the belt forms a continuous loop. Gear teeth slots 24 are provided on the underside of the belt in order that they may be engaged and driven by a suitable agricultural machine drive (not shown).

Figure 2:
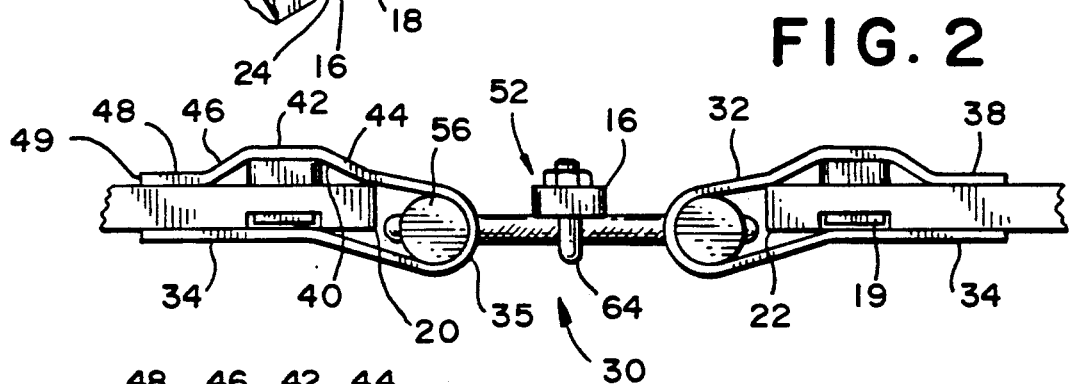
FIG. 2 illustrates a side view of the belt splice in accordance to the preferred embodiment.
Figures 3, 5:
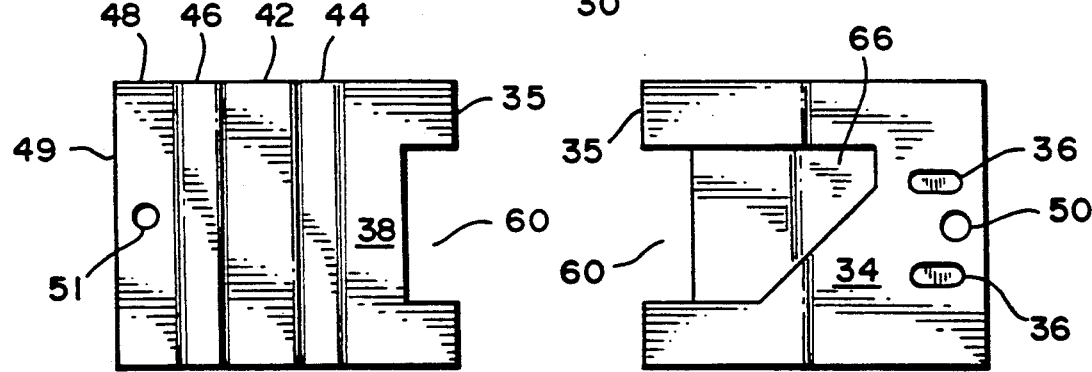
FIG. 3 is a top plane view of a hinge fastener loop in accordance with the preferred embodiment.
FIG. 5 is a bottom view of the hinge fastener loop in accordance with the preferred embodiment.
Figure 4:
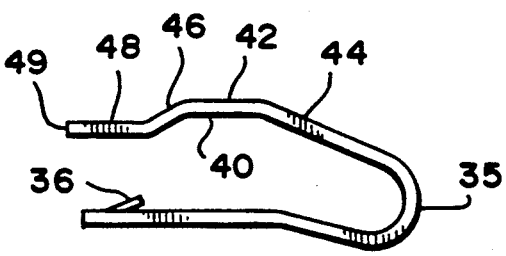
FIG. 4 is a side view of the hinge fastener loop in accordance with the preferred embodiment.

The quick or belt splice 30, as shown in more detail in FIG. 2, is used to connect the ends 20 and 22 of the belt 12 when the belt was originally manufactured or after a break has occured in order to form an endless belt. The belt splice 30 is formed of a pair of hinge fastener loops 32 which each form a jaw-like member to engage an end of the belt 12. The bottom of each hinge fastener loop 32 takes the form of a flat plate 34 with a bolt hole 50 as can be seen in FIG. 5. The lower plate portion 34 has securing tabs 36 projecting upwardly therefrom for engaging the underside of the belt 12 and the backing plate 19 of the rod attachment as best seen in FIGS. 4 and 5. The upper plate portion 38 of the hinge fastener loop 32 is similarly formed with a matching bolt hole 51 for receiving a threaded fastener (not shown). The upper plate portion 38 and lower plate portion 34 are connected by a loop portion 35 which extends forwardly from the end of the belt. The loop portion 35 functions to allow a joint assembly 52 to connect a pair of hinge fastener loops 32 together.

An important feature of the belt splice is the design of the upper plate portion 38. The upper plate portion 38 includes a rod receiving slot 40 formed by a web 42 and side members 44 and 46 forming bends which go up, over, and down the flattened ends 16 of rods 14. A fastener flange 48 having a distal end 49, extends from side member 46 a sufficient distance to allow hole 51 to be spaced from the holes 15 in the belt, shown by dotted lines, formed by the attachment of the rod 14. The distal or rearward end of the belt splice is the end space from the abutting ends of the belt. As can be seen from the drawings, the rod receiving slot 40 of the hinge fastener loop 32 fits over a flattened end 16 of a rod 14 at that location to stabilize and prevent lateral shifting of the belt splice 30. The side member 46 functions to relieve some of the tensile force pulling the belt ends apart, and transfer it from the belt itself to the belt splice structure. The side member 46 may contact rod 14, thereby relieving some of the tensile force placed on the threaded fastener. This design transfers some of the force from the belt itself to the structure of the upper plate portion 38 of the belt splice 30. The bottom tabs 36 contact the edge of the backing plate 19, thereby transferring an equal amount of the tensile force to the bottom plate 34 of the belt splice.

Also, by designing the upper plate portion 38 to include the rod receiving slot 40, hinge fastener loop 32 may be securely installed by a single threaded fastener. This is unlike the prior art which requires a plurality of fasteners. It should be noted that the more holes extending through the belt in a common area, the weaker the belt becomes. The strength of the belt is determined by the uninterrupted cross-section of the belt, therefore the advantage of securing the hinge fastener loop by one threaded fastener is significant.

In addition, by having a fastener flange 48 distal from the end of the belt the single bolt hole (51) is rearwardly spaced from the holes 15 in the belt caused by the fasteners securing the rod 14 to the belt. This spacing is significant in reducing the tendency of the belt breaking at the splice. The fastener flange 48 eliminates the need for drilling additional holes through the flattened end 16 of the rods 14, thereby not additionally weakening the belt in an already weakening common linear plane. Thus, the overall design functions to relieve a portion of the stress placed on the belt, and reduces the weakening of the belt, thereby extending the life of the belt.

Figure 6:
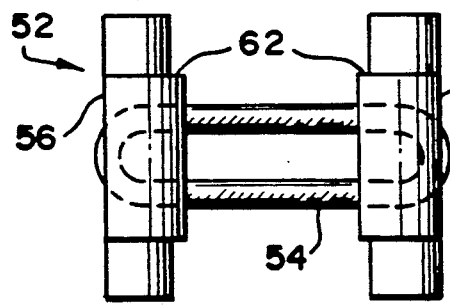
FIG. 6 shows a detailed view of a cable joint assembly.

The hinge fastener loops 32 are connected end to end by means of a cable joint assembly 52, shown in detail in FIG. 6 or a conventional hinge joint 53 as shown in FIG. 9. The cable joint assembly 52 is formed of a length of cable 54 which interconnects a pair of identical pins 56 which are structured to engage the hinge fastener loops 32. Each of the hinge fastener loops 32 are provided with a slotted opening 60 which is sized to cooperate with machined shoulders 62 on the pins 56. This structure positions the cable joint assembly in the belt splice 30 and prevents lateral movement.

It will be appreciated that the length of the cable joint assembly 52 may be adjusted by simply using more or less cable 54 in order to accommodate the spacing between the ends of the belt 12. For example, if six to eight inches of belt are lost due to a breakage at or near the fastener, it is simply a matter of providing a suitable length of cable in order to make the correction. One or more parallel rods may be connected to the cable joint assembly 52 as shown in FIG. 2 by using a suitable cable clamp 64 fastened to the flattened ends 16 of the rod 14. If the length of the cable joint is longer than an inch or two, multiple rods may be connected along the length of the cable.

The bottom plate 34 of each of the hinge fastener loops 32 is provided with an angled opening 66 which cooperates with slotted opening 60 to accommodate the pins 56 of the cable joint assembly 52 to provide a quick connect-disconnect connection. The hinge fastener loops 32 are made from any suitable metal and the angled opening 66 and slot 60 may be easily stamped out before the hinge fastener is bent to form loop 35.

In use, the belt splice for the rod belt conveyor is attached to ends of the belt in the following manner. The cable joint is connected to the hinge fastener loops by angularly positioning the pins 56 through the opening 66 on the flat bottom plate 34. The pins are positioned so that the cable 54 passes through the slots 60 in each hinged loop 32 and are held in position by the shoulders 62 abutting the edges of the slot opening 60. The ends of the belt 12 are slid into the jaws of the hinge fastener loop 32 and the flattened ends of a rod on the belt are positioned within the rod receiving slot 40 formed on the upper plate portion 38 of the hinge fastener loop. When in place, a threaded fastener (not shown) specifically designed for penetrating the rubber belt is used. The fastener has a penetrating portion with screw-like threads on the bottom and a bolt-like portion with machine threads and a head on the opposite ends. The fastener is screwed through the rubber belt and the screw like threads act to pull the bolt-like portion through the belt enabling a nut to be slipped over the penetrating portion to threadedly engage the bolt portion.

The threaded fastener is placed through the bolt hole 50 then into the belt and up through bolt hole 51 in the fastener flange 48 of the hinge fastener loops 32. The particular threaded fastener using the screw penetrating member minimizes the damage done to the belt. In addition, the rod receiving slot 40 engages the flattened ends 16 of the rod 14 so that the side members 46 absorb some of the tension. The belt splice places the total tension on the belt in a cross-section of the belt which is only weakened by one threaded fastener hole rather than two as with the other prior art devices.

As indicated above, the length of the splice can be adjusted to accommodate the distance that needs to be spanned between the ends of the belt. It will also be appreciated that various sizes of cable joint assemblies and the associated rods connected thereto can be kept in inventory since the cable joint assembly is easily connected to the hinge fastener loops as described hereinabove.

The second embodiment of the invention is shown in FIGS. 7 and 8. In this embodiment, the belt splice includes no moving parts. The splice includes a bottom plate 134 which is bent at an angle which allows the belt splice to travel about a rotating drum or drive with a minimal amount of stress being exerted on the splice. The bottom plate 134 includes bolt holes 150 and tabs 136 projecting upwardly thereon for engaging the underside of the belt 12 and the edge of the backing plate 19 as stated above in the description of the first embodiment.

The upper plate 138 is also at an angle and includes bolt holes 151. Again, the importance of the design of the upper plate 138 is noted. The configuration of a rod receiving slot 140 formed by web 142 and side walls 144 and 146 and distally extending fastener flange 148 provides the same advantages as discussed above.

The second embodiment is intended to be used as an original splice installed at the factory and would be secured to the belted chain harvester in much the same manner as that of the first embodiment, except the necessity of the hinge has been eliminated.

Although the invention has been shown and described in terms of the above preferred embodiments, it will be appreciated that there is no intent to limit the invention by such disclosure, but rather, it is intended to cover all modifications and alternate constructions falling within the spirit and scope of the invention as defined in the appended claims.

I claim:

1. A belt splice for connecting the ends of a rod belt conveyor comprising:
   a lower plate portion for engaging the underside of the belt;
   an upper plate portion having at least one rod receiving slot and a fastener flange extending from said rod receiving slot towards the distal end of said upper plate portion; and
   a matching opening on said fastener flange and said lower plate portion for a fastener to be secured therethrough, wherein said rod receiving slot and said opening on said fastener flange spaced distally from said rod receiving slot, function to allow the belt splice to be connected to one end of the belt by a single fastener.

2. A belt splice in accordance with claim 1 wherein said lower plate portion includes tabs projecting upward for engaging the underside of the belt and the edge of a backing plate which secures a rod to the belt.

3. A belt splice in accordance with claim 1 wherein said lower plate is angled in order to minimize the stress on the splice as it is rotated about a conveyor drive.

4. A belt splice in accordance with claim 1 wherein said upper plate portion has two rod receiving slots.

5. A belt splice in accordance with claim 1 wherein said lower plate portion and said upper plate portion are integrally formed to form a hinge fastener loop having a loop portion extending between said lower and upper plate portions, the loop portion extends from the end of the belt in order to connect to another hinge fastener loop.

6. A belt splice in accordance with claim 5 wherein said loop portion includes a slot for holding a hinge pin.

7. A belt splice in accordance with claim 6 wherein said lower plate portion includes an angled opening which cooperates with said slot to allow insertion of the hinge pin.

8. A belt splice in accordance with claim 1 wherein said lower plate portion includes an angled opening to allow the insertion of a hinge pin.

9. A belt splice assembly comprising:
   first and second hinge fastener loops having an upper plate with a rod receiving slot and a fastener flange extending from the rod receiving slot toward the distal end of said upper plate; and
   a hinge assembly positioned between said first and second hinge fastener, wherein the hinge assembly comprises two pins connected by a cable.

10. A belt splice in accordance with claim 9 where the hinge assembly may be adjustable in length by varying the length of the cable and wherein the two pins include machined shoulder to prevent lateral movement.

11. A belt splice in accordance with claim 9 wherein one or more rods are connected to the hinge assembly.

12. A belt splice in accordance with claim 11 wherein said rods are connected by a cable clamp.

13. A belt splice for connecting the ends of a belt having a plurality of parallel rods attached thereto comprising:
   a pair of hinge fastener loops connected by a hinge joint assembly wherein each of said hinge fastener loops comprises:
   a lower plate portion;
   an upper plate portion having a rod receiving slot and a fastener flange;
   a loop portion extending between said upper and lower plate portion for receiving and securing a hinge pin; and
   said fastener flange extends away from said rod receiving slot on the side of said rod receiving slot opposite the connection of said loop portion.

14. A belt splice in accordance with claim 13 wherein said fastener flange and said lower plate portion include matching holes for a fastener to be secured therethrough.

15. A belt splice in accordance with claim 13 wherein said lower plate portion includes an angled opening for insertion of a hinge pin.

16. A belt splice in accordance with claim 13 wherein said loop portion includes a slot for securing the hinge pin from lateral movement.

17. A belt splice in accordance with claim 13 wherein said lower plate portion includes a plurality of tabs projecting upward to engage the underside of the belt.

18. A belt splice in accordance with claim 13 wherein said hinge joint assembly comprises two pins connected by a cable.

19. A belt splice in accordance with claim 18 wherein the hinge assembly may be adjustable in length by varying the length of the cable and wherein the two pins include machined shoulder to prevent lateral movement.

20. A belt splice in accordance with claim 18 wherein one or more rods are connected to the hinge assembly.

21. A belt splice in accordance with claim 18 wherein said rods are connected by a cable clamp.

* * * * *